Figure 1:
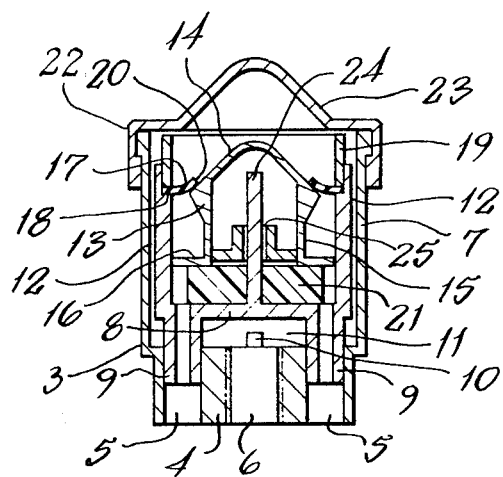

United States Patent [19]

Taylor

[11] 4,254,731
[45] Mar. 10, 1981

[54] FILTER RESTRICTION INDICATOR

[75] Inventor: Peter F. Taylor, Cambridge, United Kingdom

[73] Assignee: Engineering Components Limited, England

[21] Appl. No.: 41,456

[22] Filed: May 22, 1979

[30] Foreign Application Priority Data

May 24, 1978 [GB] United Kingdom ............... 22001/78

[51] Int. Cl.³ .......................... G01L 7/08; G01L 19/08
[52] U.S. Cl. ....................................... 116/268; 55/274; 55/DIG. 34; 73/709; 116/270; 116/DIG. 25
[58] Field of Search ............... 116/266, 270, 272, 268; 73/709; 55/274, DIG. 34

[56] References Cited

U.S. PATENT DOCUMENTS

| | | |
|---|---|---|
| 3,443,365 | 5/1969 | Lee et al. ............................. 55/274 |
| 3,465,707 | 9/1969 | Kashiwaba ........................... 116/268 |
| 3,779,080 | 12/1973 | Smith ...................................... 73/709 |
| 3,963,891 | 6/1976 | Magondeaux ...................... 55/274 X |

Primary Examiner—Daniel M. Yasich
Attorney, Agent, or Firm—William A. Drucker

[57] ABSTRACT

An indicator device for indicating when a prechosen pressure difference has been exceeded comprises a casing having two ports separated by a resilient diaphragm with an aperture therein, and a movable member urged into sealing relation with said aperture so as to prevent leakage therethrough, the configuration of the member and the aperture being selected so that, in use, the application of a prechosen pressure differential between said ports will cause the member to partly pass through the aperture to a position whereat it is retained by the diaphragm, said member being provided with means for indicating that it has been so retained.

7 Claims, 2 Drawing Figures

FILTER RESTRICTION INDICATOR

This invention relates to gas filter service life indicators of the kind used to indicate when the flow restriction due to the filter element has become excessive, for example because of clogging by a particulate filtrate material.

Such service life indicators are often arranged to maintain their warning indication once it has been given, even if the gas flow is stopped. In the particular case of an automotive engine air cleaner, it is highly desirable that the warning indication should be maintained regardless of whether the engine is operating. This is of course to avoid damage to the engine.

Many kinds of service life indicator exhibiting various degrees of complexity are known. For example, British Pat. No. 929085 discloses an indicator including a bellows, a helical spring and a mechanical latch device, the warning being given by a member which becomes visible through a transparent window on operation of the latch device, At least one other indicator uses a magnetic latch, but in general terms, most known devices are relatively complex and do not lend themselves to simplification.

According to the present invention, an indicator device for indicating when a prechosen pressure difference has been exceeded comprises a casing having two ports separated by a resilient diaphragm with an aperture therein, and a movable member urged into sealing relation with said aperture so as to prevent leakage therethrough, the configuration of the member and the aperture being selected so that, in use, the application of a prechosen pressure differential between said ports will cause the member to partly pass through the aperture to a position whereat it is retained by the diaphragm, said member being provided with means for indicating that it has been so retained.

Advantageously the movable member is provided with means capable of co-operating with the diaphragm so that once reached, the retained position is positively and unambiguously defined. For example, the movable member may be provided with an annular recess into which the margin of the aperture is received when the member reaches the retained position. This is useful in minimising the risk of the member slipping back to its non-retained starting position if the pressure differential is removed.

Whilst the means for indicating that the member has been retained may take any convenient form, including electrical indicators such as signal lamps and/or audible devices, it is particularly preferred that the indication be a direct visual one. To this end it is preferred that the casing be provided with a transparent or at least translucent portion through which the position of the movable member can be observed. Conveniently this transparent portion is in the form of a resilient end cap for the casing.

If the resilient, transparent or translucent end cap is made only sufficiently rigid to resist deformation under normal operating pressures for the indicator, it can also be used to reset the indicator, for example, after replacing a clogged filter element. In this case, the reset operation is accomplished by manually deforming part of the cap so as to push the movable member from its retained position back to the position in which it merely seals the aperture in the diaphragm, after which the deformed part of the cap is allowed to spring back to its normal attitude. In the interests of good visibility, the cap preferably has a dome which is convex relative to the casing and into which at least part of the movable member projects when in its retained position. If the geometry of the projecting part of the member and the convex dome are suitably chosen, a positive indication can be made visible over most if not all of a 180° solid angle particularly if a translucent cap is used in conjunction with a movable member which is brightly coloured.

It is also preferred that the casing be provided with guide means operable to constrain the movable member to follow a sensibly constant path relative to the aperture in the diaphragm. This is important in ensuring that the indicator operates consistently at the desired pressure differential.

Because the indicator of the present invention has only one moving part, the movable member, it is simple to manufacture. Because it uses only a simple resilient diaphragm, which can be precision moulded to exhibit a preselected degree of resistance to entry of the movable member, it is not necessary to provide and/or calibrate helical springs for desired operating pressure differentials. One movable member and a range of diaphragms will suffice to cover a sensibly wide range of pressure differentials. Because the diaphragm itself retains the movable member there is no need for any separate latch mechanism; this in itself greatly simplifies construction. Most if not all of the component parts can be made by relatively simple moulding operations from plastics and/or elastomers, as will be apparent from the following description, which is of a preferred embodiment of the invention.

Figure 2:
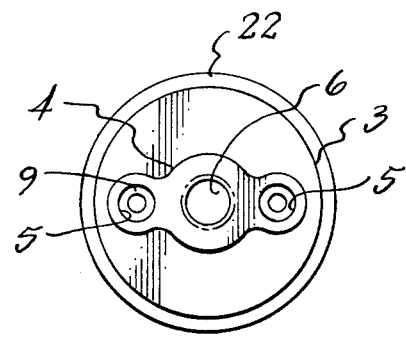

FIG. 1 of the accompanying drawings is a cross-sectional side view of an indicator device according to the invention, and:

FIG. 2 is a plan view of the base portion of the indicator of FIG. 1.

As far as is practicable, like reference numerals are used in both Figures. Referring to the Figures, a generally cylindrical casing 3 is closed at one end by an integral base portion 4 through which three bores extend. Two of these bores, 5, are diametrically disposed with respect to the third bore 6, which is internally screw-threaded for connection to a pneumatic line, as will be explained later in relation to the operation of the indicator. Inside the casing is a cylindrical insert 7 having a base portion 8 from which two tubular portions 9 project, the portions 9 being a tight push fit in the respective bores 5. The insert base portion 8 is prevented from seating on the base portion 4 of the casing by axially directed projections integral with the latter, one only of which is illustrated at 10. In this way, the bore 6 is not sealed off by the insert base portion 8, but communicates with a chamber 11 defined between the insert base and the casing.

Both the casing and the insert were injection moulded from plastics material so that the insert was a push fit in the casing However, it should be noted that the wall of the insert has a pair of small, diametrically-opposed flats on it so as to define two channels 12 extending from the chamber 11 towards the open end of the casing.

The insert 7 contains a movable member 13 having a domed head 14, a recessed portion 15, and a foot portion 16. The foot portion constitutes a relatively loose piston inside the insert; it also acts as a movement stop.

The insert also contains a resilient rubber diaphragm 17, the radially outermost margin of which is clamped between an internal ledge 18 and an annular retaining ring 19, the latter being a press fit inside the insert.

The diaphragm has a central aperture 20 and the domed head of the movable member rests against and in sealing relation to this aperture under the influence of a resilient, porous foamed plastics pad 21, which is interposed between the foot portion 16 and the base of the insert.

A guide pin 24 is formed integral with the insert base portion 8 and projects from it through the porous pad 21 and into a bore 25 in the foot portion of the movable member. The pin is a relatively loose fit in the bore and it serves only to constrain the movable member to move in a direction normal to the diaphragm 17.

The open end of the casing is fitted with a relatively stiff, but resilient plastics cap 22 having a central convex dome 23; the cap is translucent and is a substantially air tight snap fit over the end of the casing. The cap, the diaphragm and the movable member were all injection moulded from plastics material.

The operation of the above indicator device in use as a gas filter service life indicator will now be described. The indicator operates as follows, starting from the position illustrated which shows the device in the at rest (or the reset) position. Atmospheric pressure is present on the inside of the movable member by virtue of the bores 5 and the porous pad 21; bore 6 is connected through a pneumatic line to a source of less than atmospheric pressure, which in the present case is the engine side of a automotive air cleaner. As the filter becomes occluded by dust and other particulate contaminants in the inlet air flow to the engine, the pressure drop (restriction) across it increases. This is communicated through the bore 6, the chamber 11 and the channels 12 into the top of the casing, at the opposite side of the diaphragm to the movable member. As the atmospheric pressure on the underside is greater, there is a resultant force on the member urging it towards the cap 22. When the force is sufficiently great (corresponding to a large degree of clogging of the associated air cleaner filter element) the domed head of the movable member will pass through the aperture, thereafter being retained by the margin of the aperture which is received in the recessed portion 15 of the member. This prevents the member from returning to the at rest position, even if the pneumatic line is disconnected from the bore 6, or if the associated engine is stopped. The indicator can be reset by pressing down on the dome 23 so as to deform it and push the domed head of the movable member back through the aperture in the diaphragm, but it will only remain in the rest/reset position as long as the sub-atmospheric pressure is not such as to cause the indicator to operate again. In other words, the associated filter element must be replaced by a clean element, or the engine must remain stopped. Any attempt to re-start the engine with a clogged filter will immediately operate the indicator again.

By making the movable member dome portion of a very brightly coloured material, and the cap of a translucent, almost transparent material, the indication given is both positive and readily visible from all angles; the combination of such a translucent cap with a brightly coloured member has the effect of causing most of the cap to take on the colour of whatever lies just behind it. It will be appreciated that in the at rest/reset position, the domed portion member lies almost wholly within the body of the insert, but when the domed portion passes through the aperture in the diaphragm, it lies closely adjacent the underside of the convex dome 23. There is therefore an abrupt and unambiguous change in the appearance of the cap. Moreover, this is visible throughout a virtually full 180° solid angle.

Minor changes in design are possible to simplify the tooling where the parts are all to be moulded from plastics. For example, the projections 10 can be replaced by a groove in the insert base, the casing base, or both. The only important point is that the bore 6 must communicate with the space above the diaphragm. Likewise, only one bore 5 may be necessary, although the use of two may be convenient for location purposes. It is not essential that the Cap 22 be resilient, although this greatly simplifies testing the indicator by making it easy to reset.

Finally, the roles of the bores 5 and 6 may be reversed for use on above-atmospheric pressures.

I claim:

1. An indicator device, for indicating when a pressure difference has been exceeded, comprising:
   (i) a casing bounding an internal chamber and having a first port and a second port communicating with said chamber, said casing including an at least translucent portion,
   (ii) a resiliently-deformable diaphragm positioned in said chamber and secured to said casing in fluid-tight manner, said diaphragm having an aperture bounded by an internal margin,
   (iii) a member disposed in said casing and movable towards and through said aperture, said member including a margin-contacting portion in sealing relation to said margin whereby said diaphragm and said movable member together serve to divide said chamber into a first chamber portion communicating with said first port and a second chamber portion communicating with said second port, said margin-contacting portion being shaped to progressively pass through said aperture responsive to a progressively increasing pressure difference between said first port and said second port, said margin-contacting portion including retaining means which, upon movement through and beyond said margin as a result of exceeding of a predetermined pressure differential, cooperates with said margin to retain the movable member in a retained condition and prevent return movement thereof, said movable member in said retained condition being positioned within said at least translucent portion such that its retained condition can be observed.

2. An indicator device, as claimed in claim 1, wherein said retaining means define a recess into which said margin engages to retain the movable member in retained condition.

3. An indicator device, as claimed in claim 1, wherein said at least translucent portion of said casing is an end cap for said casing.

4. An indicator device, as claimed in claim 3, wherein said end cap is manually deformable to permit it to be caused to contact said movable member and cause said movable member to be pushed back from its retained condition to an initial condition corresponding to an at least lower pressure differential between said first and second ports.

5. An indicator device, as claimed in claim 3 or in claim 4; wherein said end cap includes a dome which is convex relative to said casing and defines a space into which said movable member projects when in said retained condition.

6. An indicator device according to claim 1 wherein the casing includes guide means which, in use, constrain the movable member to follow a path relative to the aperture in the diaphragm.

7. An indicator device according to claim 6 wherein the guide means is constituted by a pin which co-operates with a bore in the member so as to constrain the member to follow a path substantially normal to the plane of the aperture.

* * * * *